United States Patent
De Mattia

(10) Patent No.: US 8,636,935 B2
(45) Date of Patent: Jan. 28, 2014

(54) PROCESS FOR THE REALIZATION OF A STIFFENER MADE OF COMPOSITE MATERIAL WITH AN OMEGA SECTION

(75) Inventor: Denis De Mattia, Basse Goulaine (FR)

(73) Assignee: Airbus Operations SAS, Toulouse (FR)

( * ) Notice: Subject to any disclaimer, the term of this patent is extended or adjusted under 35 U.S.C. 154(b) by 349 days.

(21) Appl. No.: 13/117,741

(22) Filed: May 27, 2011

(65) Prior Publication Data

US 2011/0291325 A1    Dec. 1, 2011

(30) Foreign Application Priority Data

May 31, 2010   (FR) ...................................... 10 54218

(51) Int. Cl.
    *B29C 51/14*      (2006.01)
(52) U.S. Cl.
    USPC ............................. 264/257; 264/294; 264/339
(58) Field of Classification Search
    USPC .......................................... 264/257, 294, 339
    See application file for complete search history.

(56) References Cited

U.S. PATENT DOCUMENTS

| | | | | |
|---|---|---|---|---|
| 3,115,678 A * | 12/1963 | Keen et al. | ..................... | 425/343 |
| 5,032,206 A * | 7/1991 | Sigerist | ......................... | 156/358 |
| 5,151,277 A * | 9/1992 | Bernardon et al. | ........... | 425/112 |
| 6,592,795 B2 * | 7/2003 | Kasai et al. | .................... | 264/241 |
| 8,322,176 B2 * | 12/2012 | Johnson et al. | .................... | 72/75 |
| 2009/0065977 A1 * | 3/2009 | Suzuki et al. | ................. | 264/339 |

FOREIGN PATENT DOCUMENTS

FR          2936735 A1    4/2010

\* cited by examiner

*Primary Examiner* — James Sanders
(74) *Attorney, Agent, or Firm* — Young & Thompson

(57) ABSTRACT

A process for the production of a stiffener made of composite material that includes a central part with wings on both sides such that when the wings are resting against an element to be reinforced, the central part is separated from the element to be reinforced, with the process including producing a flat strip (16) that includes at least one layer of fibers, placing it on a mold (26) that includes at least one hollow shape that corresponds to the central part of the stiffener that is to be produced, heating the strip (16), and deforming it in such a way as to make it assume the shapes of the mold (26), characterized in that it includes exerting a transverse traction on the strip (16) during the deformation of the strip.

9 Claims, 3 Drawing Sheets

Figure 1:
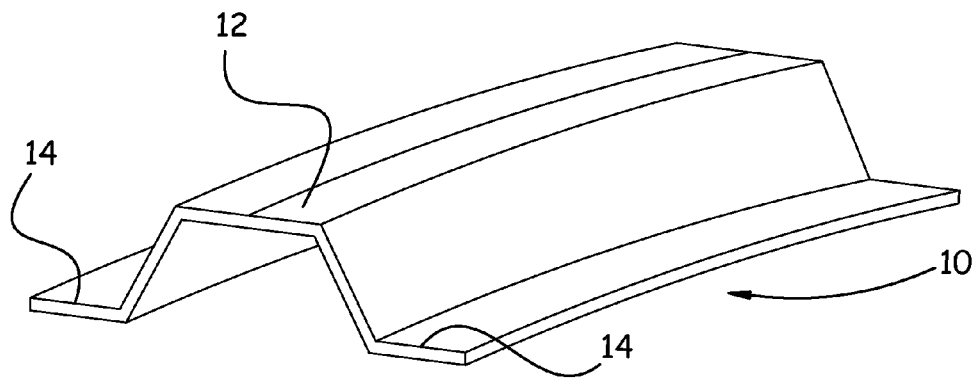

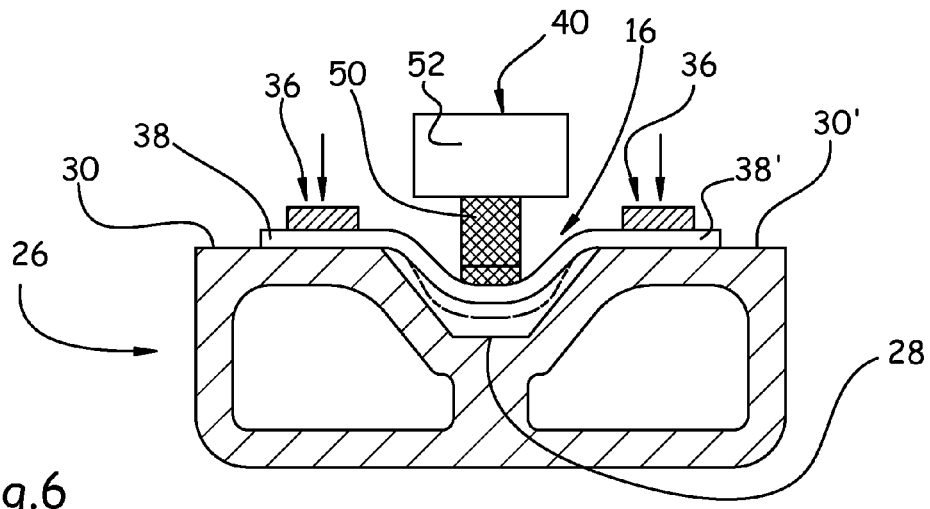
Fig.6
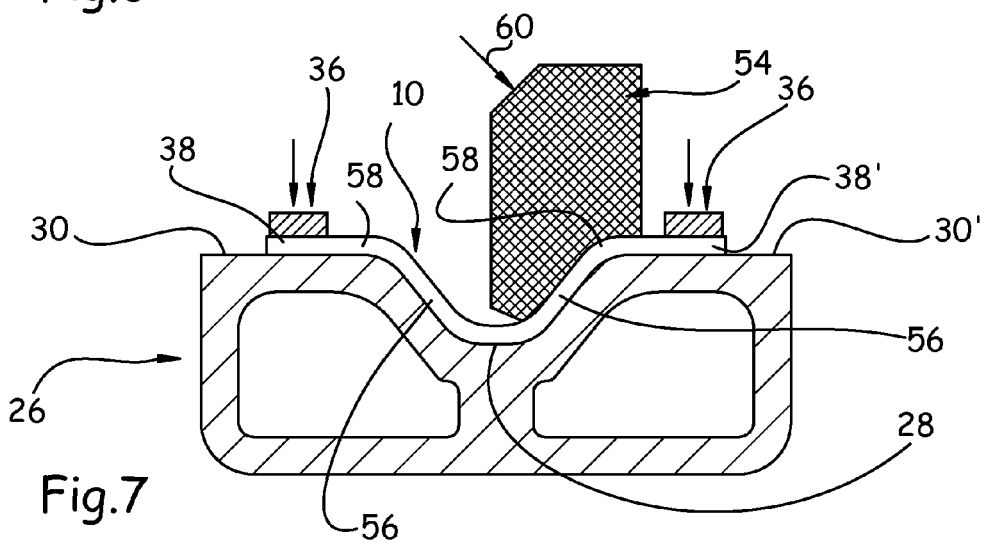
Fig.7
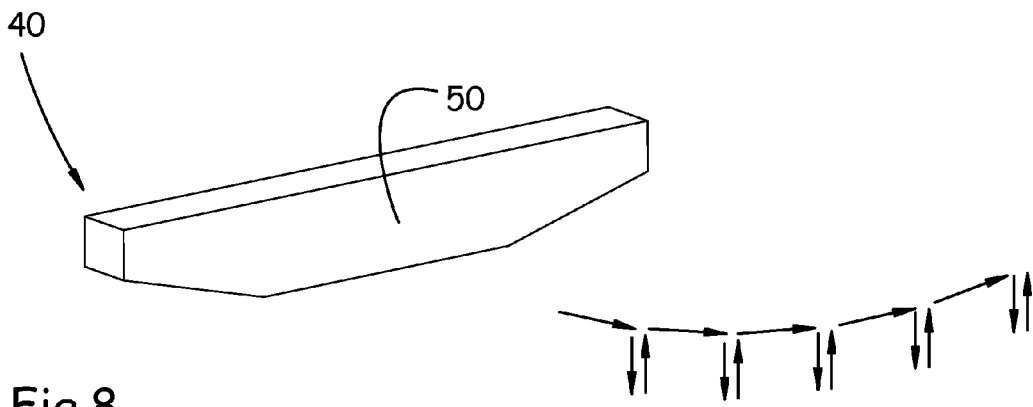
Fig.8
Fig.9

PROCESS FOR THE REALIZATION OF A STIFFENER MADE OF COMPOSITE MATERIAL WITH AN OMEGA SECTION

This invention relates to a process for the production of a stiffener made of composite material with an omega-shaped cross-section with a rectilinear or curved profile.

According to one application, this type of stiffener can constitute a reinforcement that is called a stringer, connected to the inside surface of a wall that forms the skin of an aircraft fuselage. For the fuselage sections located at the ends of the aircraft, the stringers can have a non-rectilinear but curved profile in such a way as to follow the profile of the fuselage. According to another aspect, these stiffeners can comprise discontinuities over their lengths, for example slopes on the order of 10% over several millimeters in particular due to other reinforcements that are present on the skin of the fuselage.

On the geometric plane, the cross-section of this type of stiffener comprises, on the one hand, a central U- or V-shaped part with at least two inclined flat sections optionally connected by a central portion, and, on the other hand, on each side, wings (or struts) forming support surfaces.

According to one embodiment, a stiffener can be produced by draping layers or folds of fibers immersed in a resin matrix.

According to a first operating mode, the stiffener is made between a mold (or punch) and a counter-mold (or matrix).

Previously, layers and folds of pre-impregnated fibers are draped flat, whereby the fibers are oriented correctly based in particular on stress that will be applied to the stiffener. Next, strips are cut out based on the sizes of the stiffeners. For each stiffener, the corresponding strip is heated to a temperature on the order of 80° C., and then it is placed between the mold and the counter-mold that are mounted on a heating press. The mold and the counter-mold are then closed in such a way as to form the stiffener. After one hot compacting phase whose purpose is to produce, on the one hand, an optimum degassing of the preform without drawing in the product that can form the matrix, and, on the other hand, a contraction of the preform, the mold and the counter-mold are open in such a way as to extract the stiffener that is formed.

This solution can make it possible to obtain stiffeners that are partially polymerized and to end the polymerization after the application of the stiffeners on the skin to be reinforced in such a way as to obtain a connection by co-baking between said stiffeners and said skin.

According to this operating mode, the dimensional precision of the stiffener originates from the dimensional precision of the mold and the counter-mold. Taking this fact into account, this operating mode cannot be suitable for stiffeners of great lengths to the extent that it is difficult to obtain and to preserve a device of large dimensions with the required dimensional precisions.

According to another aspect, it is necessary to use a counter-mold and/or a mold that does not expand with the temperature, for example made of a carbon-based material, to make possible the demolding of the piece, which leads to significantly increasing the cost of the device. Actually, the counter-mold or the mold would have a tendency to press the piece because of a contraction phenomenon during the cooling phase if it was metal. To eliminate this problem, the document FR-2,936,3735 provides a counter-mold or a mold made of at least two parts.

According to another operating mode that is described in, for example, the document US-2009/0081443, the stiffener is produced from strips of fibers that are unwound on a mold that comprises a hollow shape or a projecting shape and along which a truck—comprising a series of elements, in particular rollers that make it possible to gradually deform the fiber strips in such a way as to flatten them against the mold and to produce the shape of the stiffener—can move in a direction that corresponds to the length of the stiffener.

This solution makes it possible to produce stiffeners of great lengths with a satisfactory dimensional precision.

However, according to this operating mode, it may be difficult to produce certain orientations for the fibers.

According to another point, to produce a deformation of the strips by limiting the risks of folds appearing, in particular at the level of the radii of the cross-section of the stiffener, it is necessary to work at a relatively low temperature to make it possible for the strips to slide relative to one another without running the risk of adhesion between strips. This relatively low temperature does not make it possible to produce a satisfactory compacting of the strips. In contrast, if the temperature of use is increased, a satisfactory compacting is produced, but in this case, the strips have a tendency to adhere to one another and to form folds.

Consequently, this invention proposes an alternative solution to the operating mode of the prior art making it possible to produce a stiffener of great length, with a required dimensional precision, whereby the process according to the invention makes it possible to compact it in a satisfactory manner while limiting the risk of a defect appearing.

According to another objective, the process according to the invention makes it possible to control the orientation of the fibers and to obtain a partially polymerized stiffener that can be co-baked with the skin to which it is connected.

For this purpose, the invention has as its object a process for the production of a stiffener made of composite material that comprises a central part with wings on both sides such that when the wings are resting against an element to be reinforced, said central part is separated from said element to be reinforced, said process consisting in producing a flat strip that comprises at least one layer of fibers, in placing it on a mold that comprises at least one hollow shape that corresponds to the central part of the stiffener that is to be produced, in heating said strip, and in deforming it in such a way as to make it assume the shapes of said mold, characterized in that it consists in exerting a transverse traction on the strip during the deformation of said strip and in that the deformation is done step by step in several passes.

Figure 2:
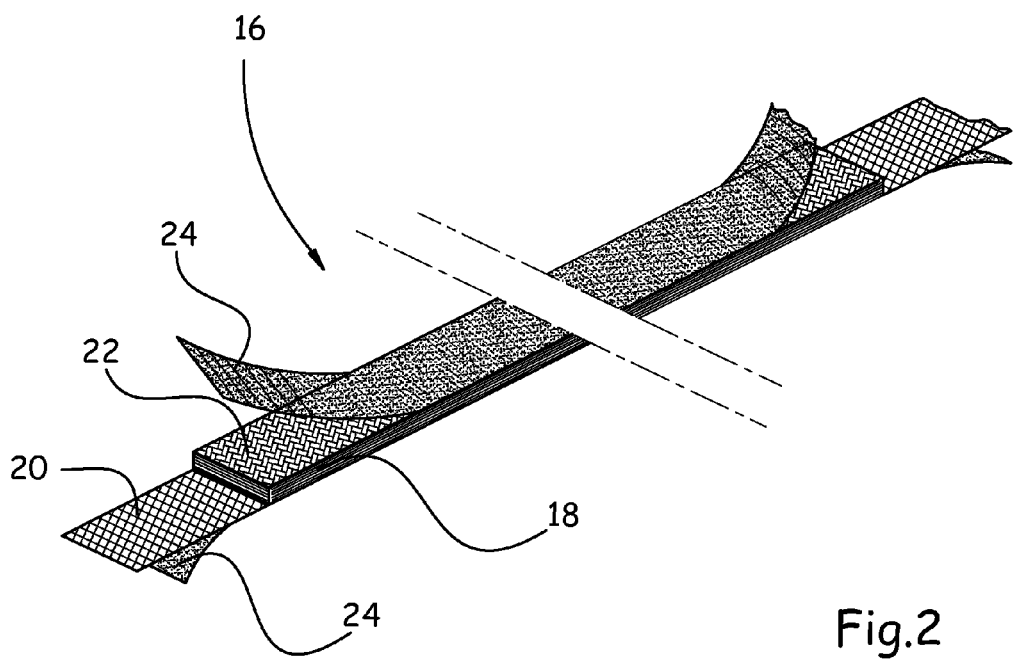
Figure 3:
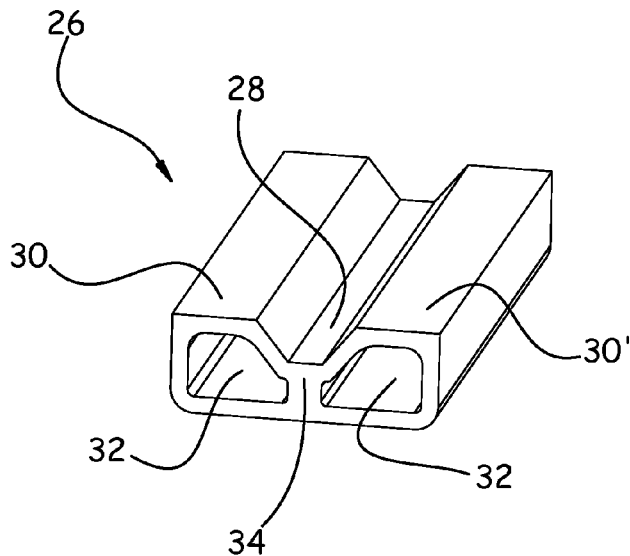
Figure 4:
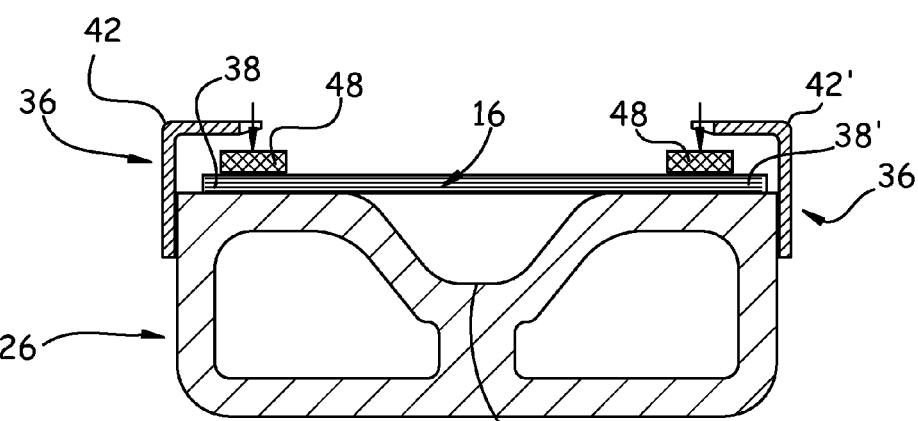
Figure 5:
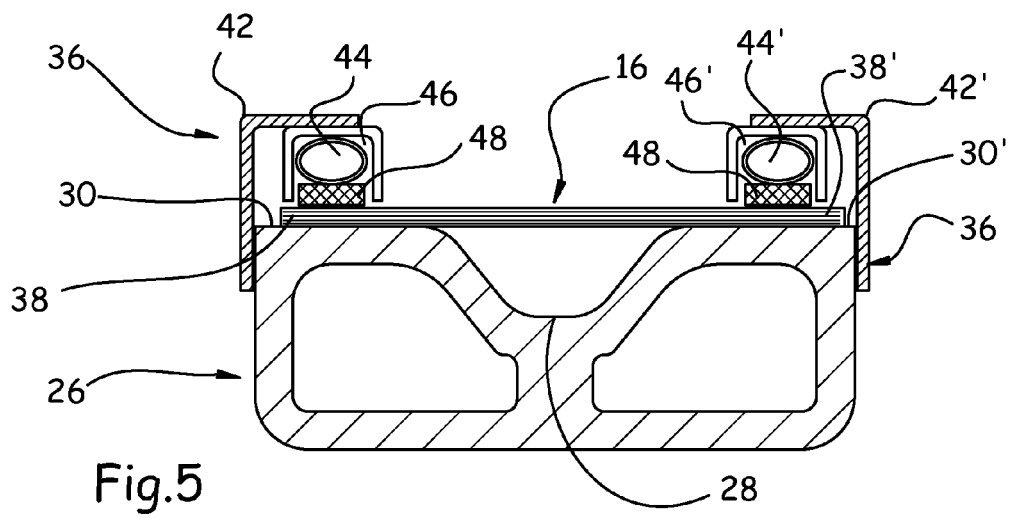

Other characteristics and advantages will emerge from the following description of the invention, a description that is provided only by way of example, relative to the accompanying drawings in which:

FIG. 1 is a perspective view of a stiffener,

FIG. 2 is a perspective view of a flat strip that illustrates the different folds that constitute it before being deformed, FIG. 3 is a perspective view of a mold according to the invention, FIG. 4 is a cutaway of a mold with means for holding a strip to be deformed according to a first embodiment, FIG. 5 is a cutaway of a mold with means for holding a strip to be deformed according to another embodiment, FIG. 6 is a cutaway that illustrates the deformation of the strip, FIG. 7 is a cutaway that illustrates the contraction of the strip, FIG. 8 is a perspective view of a tool that makes possible the deformation of the strip, and FIG. 9 is a diagram that illustrates the movements of the tool that is illustrated in FIG. 8.

FIG. 1 shows a stiffener 10 that comprises a non-flat central part 12 with wings 14 on both sides that can be used as a support surface when said stiffener is connected to an element to be reinforced, whereby said central part is separated from said element that is to be reinforced.

According to one application, this stiffener is able to be connected to the inside surface of a skin that forms the fuselage of an aircraft. However, the invention is not limited to this application.

By way of example, the central part 12 is U-shaped with tapered arms. Of course, the invention is not limited to this stiffener form. By way of indication, the stiffener can have a thickness on the order of 2 mm, a U-shaped base on the order of 12 mm, with the arms of the U on the order of 20 mm, and wings on the order of 30 mm, whereby the arms of the U form with the base an angle on the order of 120°.

Hereinafter, longitudinal direction is defined as the direction that corresponds to the length of the stiffener. If the stiffener is curved, the longitudinal direction corresponds to the tangent at one point of the curve that corresponds to the radius of curvature of the stiffener according to its length. Transverse direction is defined as a direction that is perpendicular to the longitudinal direction and parallel to the wings of the stiffener.

The stiffener comprises at least one fold or one layer of pre-impregnated fibers. The type of the fibers and the resin can vary based on desired characteristics.

According to one operating mode, a flat draping of the different folds that are necessary to produce the stiffener is achieved. This laying-down of the different folds can be done automatically using a draping machine.

This operating mode makes it possible to orient the fibers in determined directions. Likewise, this solution makes it possible to vary the number of folds over the length of the stiffener in such a way as to obtain, for example, reinforced zones.

Advantageously, a stack of different folds is produced, and then strips are cut, with each strip corresponding to a stiffener.

FIG. 2 shows a strip 16 that is used to produce a stiffener 10. This strip has a length that is slightly greater than that of the finished stiffener, and it has a width that is slightly greater than the developed width of the finished stiffener.

According to one embodiment, this strip 16 comprises at least one layer of carbon fibers 18 and at least one layer of glass fibers on one of the upper or lower surfaces. These different layers are preferably pre-impregnated.

The strip 16 comprises a layer of glass fibers 20 at the lower surface and advantageously one layer of glass fibers 22 at the upper surface.

As illustrated in FIG. 2, the glass layer 20 has a length that is greater than that of the carbon fiber layer(s) 18 in such a way as to extend beyond said layers 18 at each end, for a reason that will be explained below.

Advantageously, the strip 16 comprises plastic protective films 24 on its upper and lower surfaces.

To produce the shaping, a shaping device comprising a mold 26 with a central hollow shape 28 corresponding to the central part 12 of the stiffener and support surfaces 30, 30' on both sides corresponding to the wings 14 of the stiffener is used. The mold has shapes that correspond to the shapes of one of the surfaces of the stiffener.

The shaping device comprises means for heating the strip.

Preferably, the strip is brought to temperature by heating the mold.

Preferably, the mold comprises at least one channel 32 that extends over the entire mold, in which hot air can circulate in such a way that the surface of the mold 26 that is in contact with the strip 16 is at a temperature on the order of 80° C. This temperature makes it possible to obtain a partial polymerization (which makes possible a subsequent co-baking) and a satisfactory contraction.

According to one embodiment, the mold has an essentially rectangular hollow cross-section, whereby the upper side comprises a hollow or projecting shape. To ensure the uptake of forces, the mold comprises a central partition 34 that delimits the hollow cross-section in two channels 32. At each end, the mold comprises means for connecting it to a hot air circuit. This circuit as well as the means for generating a stream of hot air are not presented in more detail because they are known to one skilled in the art.

According to one embodiment, the mold can be made of carbon.

In FIG. 3, the mold has an essentially rectilinear profile for simplifying the representation. However, the profile of the mold can be curved according to the profile of the stiffener that is to be produced.

According to a significant characteristic of the invention, the device for shaping the strip comprises, on the one hand, means 36 for maintaining the two lateral edges 38, 38' of the strip 16, and, on the other hand, deformation means 40 that make possible the shaping of the central part of the stiffener.

The holding means 36 of the two lateral edges 38, 38' make it possible to exert traction on the strip in a transverse direction.

This arrangement makes it possible to limit the folds of the layers that form the strip 16. According to another aspect, in the case of a gradual deformation performed step by step, the means 36 hold the shape of the strip between two successive deformations and prevent it from resuming its shape before said deformation.

Preferably, the means 36 hold the strip while it is not subjected to a tensile force that is greater than or equal to a threshold on the order of 30 daN/m, whereby this force is split both into the layer that is connected against the upper surface of the carbon layer(s) and into the layer that is connected against the lower surface of the carbon layer(s).

Thus, the strip is deformed while keeping the tensile forces both at the level of the layer that is connected against the upper surface of the carbon layer(s) and the layer that is connected against the lower surface of the carbon layer(s).

Advantageously, the holding means 36 exert a compression force of the lateral edges 38, 38' against the support surfaces 30, 30' such that the strip can slide between said means 36 and the mold when the deformation means 40 exert a force that is greater than a certain threshold that corresponds to the traction threshold previously specified.

According to one embodiment that is illustrated in FIG. 4, the holding means 36 come in the form of two angle bars 42, 42' with an L-shaped cross-section (also called pressure pads), one for each lateral edge 38, 38', whose profile is adjusted to that of the mold, able to move toward the support surfaces 30, 30' of the mold 26 in such a way that the lateral edges are clamped between the angle bars and the mold. In addition, the shaping device comprises means for flattening the angle bars on the mold, which make it possible to adjust the compression force of the lateral edges of the strip and therefore to control the sliding of said edges.

According to another embodiment that is illustrated in FIG. 5, the holding means 36 comprise pneumatic flanges 44, 44', extending over the length of the stiffener, inserted between the strip and angle bars 42, 42' that are essentially analogous to the angle bars of the preceding variant with means for keeping said flanges 44, 44' in the form of housings 46, 46'. Advantageously, the device comprises means for regulating the pressure inside the flanges.

According to this variant, the pressure exerted by the holding means 36 is adjusted by regulating the pressure inside the flanges 44, 44'.

Advantageously, it is possible to provide a shim 48 between each angle bar 42, 42' or each flange 44, 44' and the strip in such a way as to promote the sliding of the strip relative to said angle bars. According to one embodiment, these shims 48 extend over the length of the stiffener and are made of polytetrafluoroethylene.

According to another characteristic of the invention, the strip 16 comprises at least one layer 18 made of fibers of a first type in particular of carbon placed between two protective layers. As appropriate, a protective layer can be a layer that is specific to shaping and that is subsequently peeled in the manner of protective films 24 or which can be a layer forming the stiffener, such as, for example, a layer of glass fibers.

Thus, during the deformation, the carbon layers slide between them without running the risk of folds since they are placed between two protective layers between which there are only tensile stresses.

Advantageously, the shaping device comprises means for exerting a tensile force on the strip 16 in the longitudinal direction (corresponding to the length of the stiffener) at each end of said strip.

For this purpose, in the presence of a layer of glass fibers at the lower surface of the strip that is in contact with the mold, the longitudinal traction will be exerted at each end of said layer of glass fibers that extend beyond the ends of the layers of carbon fibers. According to one embodiment, the means for exerting longitudinal tensile force can come in the form of jaws. However, other solutions can be considered.

Different solutions can be considered for deformation means 40. For example, it would be possible to consider a series of rollers as described by the document US-2009/0081443.

According to another embodiment that is illustrated in FIGS. 6, 8, and 9, the deformation means 40 comprise at least one pad 50 that can move at least in a vertical direction and that can exert force on the strip at its central part in such a way as to gradually deform it so as to make it assume the hollow shape of the mold 26.

According to one embodiment, this pad 50 is made of elastomer. According to another point, it has a width that is essentially equal to the width of the base of the U of the stiffener 10 and is positioned relative to the mold so as to exert a force that is essentially centered relative to the hollow shape of the mold 26.

According to a first variant, not shown, the pad can have a length that corresponds to that of the stiffener to be produced. In this case, it is attached to a tool holder that can move vertically. The speed of advance of the pad is to be relatively slow to optimize the deformation, on the order of 1 mm/s.

According to another variant, more suitable for producing stiffeners of great length, the pad has a length that is less than that of the stiffener. In this case, the shaping device comprises a tool holder 52 that can move perpendicularly to the mold in such a way as to deform the strip 16 but also in the longitudinal direction of the stiffener. In this case, the deformation operation is carried out step by step as illustrated in FIG. 9, the step corresponding to the length of the so-called active surface of the pad 50 that is able to be in contact with the strip 16.

According to this variant, the total deformation of the strip is carried out in several passes, whereby with each pass, the strip is deformed over a low height on the order of 2 mm so as not to produce too much stress between the deformed zone and the adjacent zone that is deformed at the next step. The deformation speed is relatively slow to optimize the deformation, on the order of 1 mm/s.

The tool holder and the different actuators that can generate its movements are not described in more detail because they can assume different configurations and are within the scope of one skilled in the art.

When the strip comes into contact with the mold at its central part, the pad 50 is used to exert a compression force and to compact the layers of the strip and to produce the effective contraction of the stiffener.

When the hollow part of the mold comprises a central part and inclined flat sections, it is possible to provide at least a second pad 54 (illustrated in FIG. 7) in such a way as to compact the portion of the strip that is in contact with said inclined flat sections. This second pad 54 has a profile that is identical to that of a portion of the cross-section of the stiffener that covers one of the U-shaped arms 56 and the junction zone 58 between said arm and the corresponding wing.

This contraction phase of at least a portion of the cross-section of the stiffener can be performed step by step in the manner of the deformation of the central part so as to produce the contraction over the entire length of the stiffener whereas the second pad has a length that is less than that of the stiffener.

Advantageously, this second pad 54 moves in an oblique direction 60 in such a way as to produce compression forces and to limit the shearing forces at the stiffener.

It is possible to provide several second pads 54, each intended for a portion of the cross-section of the stiffener.

According to one embodiment, the second pad(s) is or are made of elastomer.

After the contraction, the stiffener is cooled. According to a variant, a forced cooling of the stiffener is produced in such a way as to lower its temperature quickly.

If necessary, the contour of the stiffener is cut out to the desired sides. Advantageously, this detour operation is performed by pressing the stiffener against the mold with the holding means 36. According to an operating mode, it is possible to use an ultrasound knife mounted on an actuator for performing the detour.

Before or after the cutting, the protective layer(s) attached to the surface of the stiffener that is not in contact with the mold is/are removed.

It is possible to use the shaping device to bring or deposit the stiffener in its place on the wall to be reinforced by having placed in advance a core in the hollow part of the stiffener. In addition, this device can be used as a part of the device for polymerization of the reinforced wall.

The invention claimed is:

1. Process for the production of a stiffener made of composite material that comprises a central part (12) with wings (14) on both sides such that when the wings are resting against an element to be reinforced, said central part is separated from said element to be reinforced, with said process consisting in producing a flat strip (16) that comprises at least one layer (18) of fibers, in placing it on a mold (26) that comprises at least one hollow shape that corresponds to the central part (12) of the stiffener that is to be produced, in heating said strip (16), and in deforming it in such a way as to make it assume the shapes of said mold (26), wherein the method includes exerting a transverse traction on the strip (16) during the deformation of said strip, the deformation is done step by step in plural passes, on each of the passes the strip is further deformed, and the deformation is performed using a pad whose length is less than that of the stiffener.

2. Process for the production of a stiffener according to claim 1, wherein it consists in using holding means (36) that exert a compression force of the lateral edges (38, 38') against the mold (26).

3. Process for the production of a stiffener according to claim 2, wherein the holding means (36) prevent the lateral edges (38, 38') of the strip from sliding when the deformation does not produce a tensile force that is greater than or equal to a threshold on the order of 30 daN/m.

4. Process for the production of a stiffener according to claim 1, wherein the strip comprises at least one layer of fibers (18) placed between two protective layers.

5. Process for the production of a stiffener according to claim 1, wherein the temperature of the strip (16) is on the order of 80° C. during the deformation.

6. Process for the production of a stiffener according to claim 1, wherein a tensile force is exerted on the strip (16) in the longitudinal direction.

7. Process for the production of a stiffener according to claim 1, wherein with each pass, the strip is deformed about 2 mm.

8. Process for the production of a stiffener according to claim 1, wherein after deformation, the strip is compressed against the mold in such a way as to obtain a contraction.

9. Process for the production of a stiffener according to claim 1, wherein with each pass, the strip is deformed about 1 mm.

\* \* \* \* \*